(12) United States Patent
Baughman et al.

(10) Patent No.: US 10,389,827 B2
(45) Date of Patent: Aug. 20, 2019

(54) PROCESS FOR STREAMING CONTENT MODIFICATION THROUGH REMOTE AND LOCAL USER ENTANGLEMENT

(71) Applicant: International Business Machines Corporation, Armonk, NY (US)

(72) Inventors: Aaron K. Baughman, Silver Spring, MD (US); Stephen C. Hammer, Marietta, GA (US); Christopher E. Holladay, Marietta, GA (US); Mauro Marzorati, Lutz, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 192 days.

(21) Appl. No.: 15/463,506

(22) Filed: Mar. 20, 2017

(65) Prior Publication Data
US 2018/0270286 A1    Sep. 20, 2018

(51) Int. Cl.
| | | |
|---|---|---|
| *G06F 15/16* | (2006.01) | |
| *H04L 29/08* | (2006.01) | |
| *H04W 40/24* | (2009.01) | |
| *H04W 4/029* | (2018.01) | |
| *H04L 29/06* | (2006.01) | |

(52) U.S. Cl.
CPC .......... *H04L 67/22* (2013.01); *H04L 65/4076* (2013.01); *H04L 65/601* (2013.01); *H04L 67/18* (2013.01); *H04W 4/029* (2018.02); *H04W 40/244* (2013.01)

(58) Field of Classification Search
CPC ....... H04L 65/604; H04L 43/16; H04L 67/18; H04L 67/22

USPC .......... 709/201–203, 217–219, 231
See application file for complete search history.

(56) References Cited

U.S. PATENT DOCUMENTS

| | | |
|---|---|---|
| RE44,095 E | 3/2013 | Sanchez |
| 8,595,761 B2 | 11/2013 | Amsterdam et al. |
| 9,491,588 B1 * | 11/2016 | Biehl .................... H04W 4/043 |
| 2002/0021277 A1 | 2/2002 | Kramer et al. |
| 2007/0188712 A1 | 8/2007 | Kutner |
| 2013/0073389 A1 | 3/2013 | Heath |
| 2014/0280502 A1 | 9/2014 | Cronin |

(Continued)

OTHER PUBLICATIONS

Han et al; A Real-Time Augmented-Reality System for Sports Broadcast Video Enhancement, MM'07, Sep. 23-28, 2007, Augsburg, Bavaria, Germany.

(Continued)

*Primary Examiner* — Bharat Barot
(74) *Attorney, Agent, or Firm* — Garg Law Firm, PLLC; Rakesh Garg; Christopher K. McLane

(57) ABSTRACT

Focus data of a remote user is analyzed to determine a focus shift from a first area to a second area at an event arena. A beacon density is computed at the second area, where the beacon density includes a number of physical beacons corresponding to a number of local users at the second area, a number of virtual beacons corresponding to a number of remote users focused on the second area, or a combination of thereof. When the beacon density at the second area exceeds a threshold density, an instruction to a streaming source is generated. The streaming source is caused to change a streaming content, to form changed streaming content that is related to the second area.

20 Claims, 6 Drawing Sheets

(56) References Cited

U.S. PATENT DOCUMENTS

2015/0170455 A1    6/2015  Rad et al.
2017/0201779 A1*   7/2017  Publicover ............ H04L 67/306
2018/0152820 A1*   5/2018  Lin ....................... H04W 4/043
2018/0190382 A1*   7/2018  Ramezani ............... H04L 67/22

OTHER PUBLICATIONS

Barakonyi et al; Collaborative Work with Volumetric Data Using Augmented Reality Videoconferencing, Proceedings of the second IEEE and ACM International Symposium on Mixed and Augmented Reality (ISMAR '03).

* cited by examiner

US 10,389,827 B2

PROCESS FOR STREAMING CONTENT MODIFICATION THROUGH REMOTE AND LOCAL USER ENTANGLEMENT

TECHNICAL FIELD

The present invention relates generally to a method, system, and computer program product for improving a user's experience with a streamed content of an event. More particularly, the present invention relates to a method, system, and computer program product for event experience enhancement through remote and local user entanglement.

BACKGROUND

Many types of events are enjoyed or experienced by users present at the event and users experiencing the vent remotely. For remote enjoyment, events are covered and delivered via broadcast media and streaming media. For example, a sporting event is enjoyed by viewers who are present at the stadium, viewers watching the sporting event on a television, and viewers who are following the event via streamed content.

A user who is physically present at an event is hereinafter referred to as a local user. A user who is observing the event remotely is hereinafter referred to as a remote user. A local user can also be a remote user in that the local user can be physically witnessing the event as well as following the streaming content of the event on a device.

Broadcast content of an event is selected by the broadcaster. In other words, a broadcasting entity decides, which part of the event to cover, how to cover that part, and for how long. Local or remote users often do not have a say in the broadcast coverage of the event.

Given the proliferation of social media platforms, many users take to social media to follow events, comment on the event progression, express likes and dislikes about incidents occurring at the event, and so on. It is not uncommon for a side-event or an unexpected part of the event to begin trending on social media. For example, suppose that the event is a tennis match being played at the main court of an arena during a tournament. It is quite possible, and it often happens, that something interesting might occur at another court where a game may or may not be in progress. For example, someone might start a disturbance, an unexpected progression might occur in the game, an accident or a surprise might happen at that court, and the like. Such occurrences might not be covered by the broadcast media—who are focused on the main event at the main court, but the occurrence might begin trending on social media.

SUMMARY

The illustrative embodiments provide a method, system, and computer program product. An embodiment includes a method that analyzes focus data of a remote user to determine a focus shift from a first area to a second area at an event arena. The embodiment computes a beacon density at the second area, wherein the beacon density comprises a combination of (i) a number of physical beacons corresponding to a number of local users at the second area, and (ii) a number of virtual beacons corresponding to a number of remote users focused on the second area. The embodiment generates, responsive to the beacon density at the second area exceeding a threshold density, an instruction to a streaming source. The embodiment causes the streaming source to change a streaming content to form changed streaming content, wherein the changed steaming content is related to the second area.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
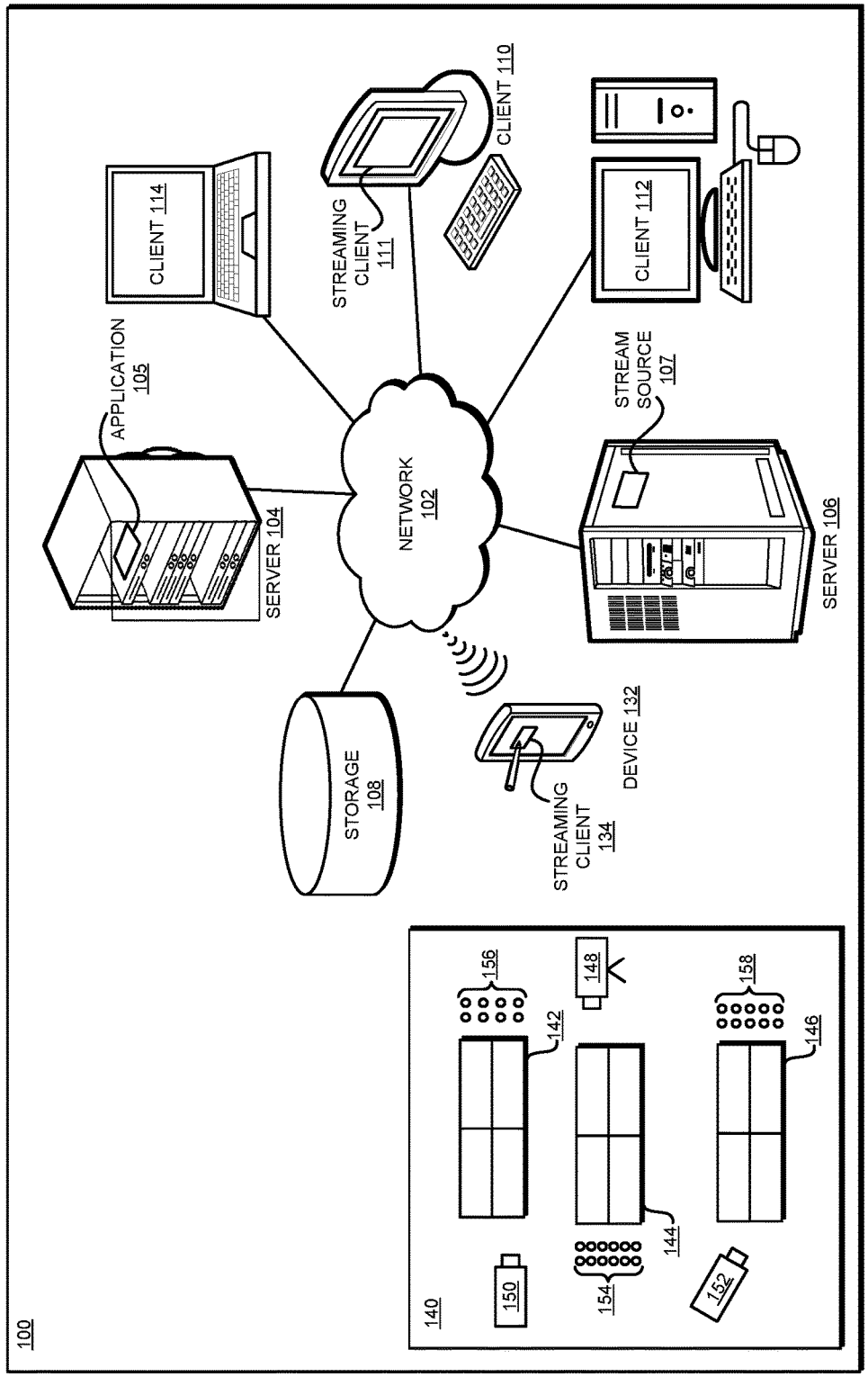
FIG. 1 depicts a block diagram of a network of data processing systems in which illustrative embodiments may be implemented.

The illustrative embodiments recognize that while local or remote users are largely unable to influence broadcast coverage of an event, users can contribute to how the event is covered in streaming media. Particularly, the experience of the event by the local users and the remote users can be enhanced by entangling the experiences or shifting focus of each group in the streamed content. The streamed content can be modified or changed to move or shift focus as a group of local users shifts focus on the event, as a group of remote users shifts focus on the event, or both.

A local user can shift his or her focus on the event by physically relocating to a different location in an event area. For example, suppose Joe is present at an arena and watching the main match being played on court 3 of the arena. Joe hears excitement and cheers coming from distant court 5 where nothing of significance is supposed to be happening. Joe decides to go to court 5 to find out the reason for the excitement. Joe has also been tracking the coverage of the match via streamed content on a device associated with Joe. As Joe moves to court 5, Joe's device moves to court 5 with him. The movement of Joe's device corresponds to the local user Joe shifting focus. Joe's device is treated as a physical beacon, whose location can be tracked.

A remote user can shift his or her focus on the event by diverting attention or focus of a device to (i) a view of a different area at the event location, (ii) focusing on or interacting with a social media conversation about the different area at the event location, or (iii) both (i) and (ii). For example, assume that Jane is remotely viewing the streaming of the main match being played on court 3 of the arena. Jane sees social media topic "Player John Doe chilling by court 5," and begins reading and/or contributing to the topic. Jane's device has now shifted the focus to court 5 instead of the main court.

Alternatively, if Jane's device has controllable view of the courts, Jane adjusts the view to try and see the events unfolding on court 5 instead of court 3. Jane's device can shift the focus in this manner as well. Of course, Jane can try and bring court 5 in view as well as participate in the social media topic about court 5, and the combination of the two activities shifts the focus of remote user Jane. A mechanism that can provide information about a target of a focus of remote user Jane is treated as a virtual beacon corresponding to the remote user.

The illustrative embodiments recognize that the enjoyment of streaming content can be enhanced for a local user, a remote user, or both, if the movements of focus of the local user can be entangled with the experience of the remote user, and vice-versa. In other words, the illustrative embodiments recognize that the experience of the remote (or local) user with the streaming content of an event will be enhanced if the streaming content can be changed according to the shifting focus of a significant sized group of local and remote users.

The illustrative embodiments recognize that the presently available tools or solutions do not address these needs or provide adequate solutions for these needs. The illustrative embodiments used to describe the invention generally address and solve the above-described problems and other problems related to event experience enhancement through remote and local user entanglement.

An embodiment can be implemented as a software application. The application implementing an embodiment can be configured as a modification of an existing content streaming system—i.e., a native application in the called system, as an application executing in a data processing system communicating with an existing content streaming system, a standalone application, or some combination thereof.

A group of local and remote user is formed by a number of physical beacons, virtual beacons, or a combination thereof, being present in a defined proximity of one another in an area. A size of the group is determined by the number of beacons—physical and virtual—that are present in a group for at least a threshold duration, called the dwell duration or dwell period. A dwell period is a length of time a beacon stays within a defined distance of a location, or within an area—such as within a geofence.

An embodiment determines that a remote user is shifting focus to a different area at an event location. The embodiment can determine that the focus of one or more remote users is shifting according to a remote-user-specific method described earlier. Generally, the shifting of the focus of a remote user can be inferred even if a particular remote user does not shift the focus in a manner described herein. For example, if an event is being broadcast from court 3 and a topic about court 5 begins to trend on social media, an embodiment can infer from the analyzing the social media data and the trending information that at least some remote users have shifted their focus to the happenings at court 5. As a non-limiting example, such an inference can be made when at least a threshold trend is observed about a topic, e.g., at least a specified number of social media communications per specified period are occurring about the topic. As another non-limiting example, such an inference can also be made when at least a threshold number of social media communications have accumulated about a topic.

If the focus has shifted for a remote user, the embodiment computes a dwell period at the location of the shifted focus. For example, when the trending information is used to determine the shift in the focus of remote users, the dwell period may be a period during which the trend is sustained.

The embodiment determines whether a sufficient density of beacons—physical and/or virtual—has been achieved at the location of the focus for a threshold duration. The density of beacons in a number of beacons in a given area or location. When at least a threshold beacon density has been maintained at the different area for at least a threshold duration, the embodiment instructs a streaming source to change the stream such that the changed stream provides information about the occurrences at the area of the shifted focus.

Similarly, an embodiment determines that a local user is shifting focus to a different area at an event location. The embodiment can determine that the focus of one or more local users is shifting according to a local—user-specific method described earlier.

If the focus has shifted for a local user, the embodiment computes a dwell period at the location of the shifted focus. For example, when the local user is walking past court 4 in less than a given period of time, the local user will not have dwelled at court 4 on the way to court 5. But when the local user stops at court 5 for the period, the local user will have dwelled at court 5 for at least a threshold dwell period.

The embodiment determines whether a sufficient density of beacons—physical and/or virtual—has been achieved at the location of the focus for a threshold duration. The density of beacons accounts for a group of local users focused on the location, a group of remote users focused on the location, or groups of both local and remote users focused on the location. When at least a threshold beacon density has been maintained at the different area for at least a threshold duration, the embodiment instructs a streaming source to change the stream such that the changed stream provides information about the occurrences at the area of the shifted focus.

The changed stream is made available on a device of a local user as well as a remote user. A remote user may or may not be one who shifted his or her focus, but will receive the benefit of the shifting focus of other remote and local users, thereby enhancing the remote user's experience from the streaming content. Similarly, the local user may or may not be one who shifted his or her focus, but will receive the benefit of the shifting focus of other remote and local users, thereby enhancing the local user's experience from the streaming content.

The manner of event experience enhancement through remote and local user entanglement described herein is unavailable in the presently available methods. A method of an embodiment described herein, when implemented to execute on a device or data processing system, comprises substantial advancement of the functionality of that device or data processing system in fabricating semiconductor devices where the depth of implanting a dopant into a 35 m layer has to be controlled.

The illustrative embodiments are described with respect to certain types of events, event locations, areas, local users, remote users, manners of shifting focus, dwell period, social media data, streaming of content, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
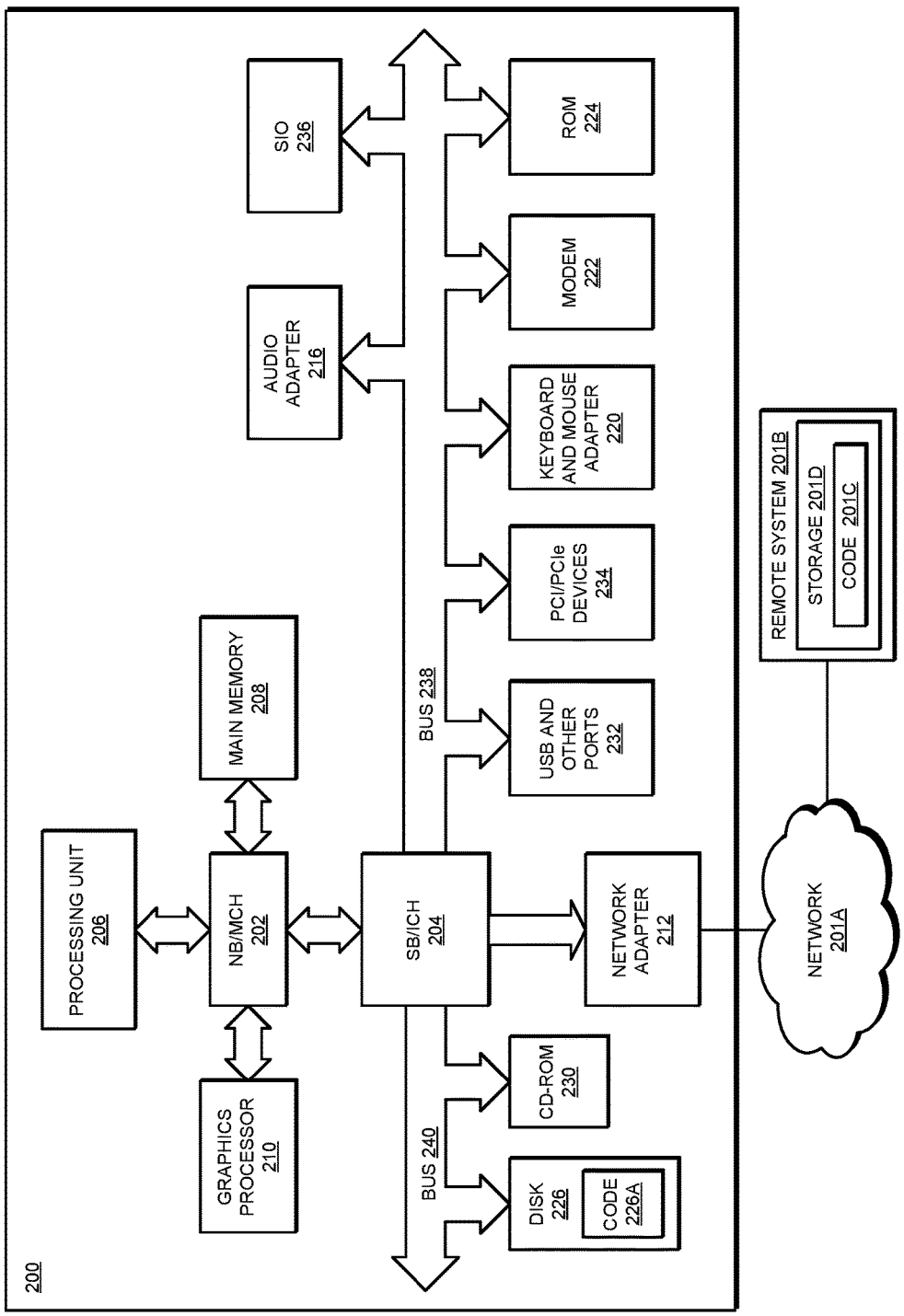
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Stream source 107 provides streaming content to users. Suppose that a local user is consuming the streaming content via streaming client 134 on device 132. Similarly suppose that a remote user is consuming the streaming content via streaming client 111 in client 110.

As a non-limiting example, suppose that the streaming content pertains to a tennis tournament at event location 140 where multiple courts 142, 144, and 146 are available. Broadcasting device 148 may be configured to capture the events at main court 144. Streaming device 150 may be configured to capture events around court 142 and streaming device 152 may be configured to capture events on court 146. Group 154 comprises local users, as represented by their physical beacons, who are observing the events on court 144. Similarly, group 156 comprises local users, as represented by their physical beacons, who are observing, or have shifted focus to observe, the events on court 142, and group 158 of local users are observing, or have shifted focus to observe, the events on court 146. Streaming source 107 uses a streaming device (not shown) to stream the events from main court 144. Streaming source 107 can use streaming device 150 to stream the events from court 142, and streaming device 152 to stream the events from court 146, when sufficient beacon density has been achieved at or around either of those courts.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
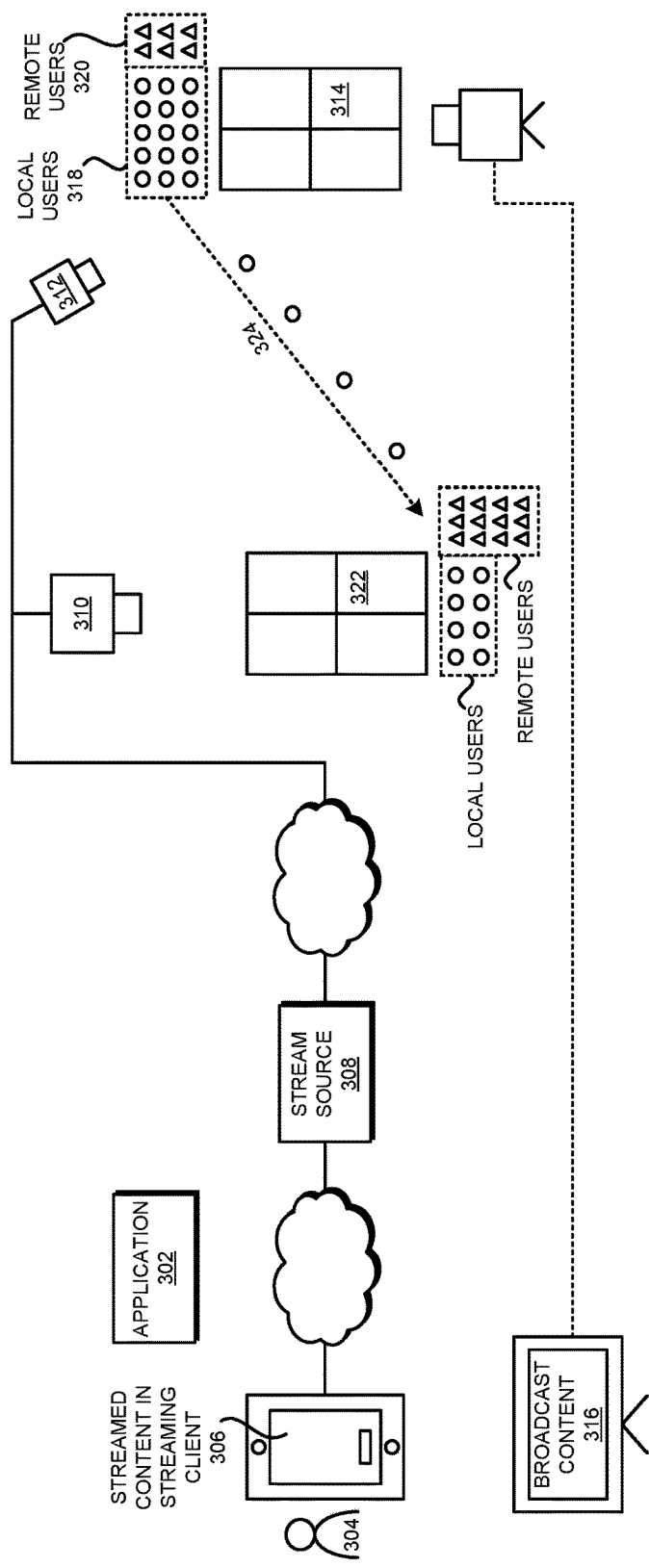
FIG. 3 depicts a block diagram of an example configuration for event experience enhancement through remote and local user entanglement in accordance with an illustrative embodiment.

With reference to FIG. 3, this figure depicts a block diagram of an example configuration for event experience enhancement through remote and local user entanglement in accordance with an illustrative embodiment. Application 302 is an example of application 105 in FIG. 1.

User 304 is an example remote user who is consuming streamed content 306 in streaming client 134 in device 132 of FIG. 1. Streaming source 308 is an example of streaming source 107 in FIG. 1, and provides streamed content 306 captured via streaming device 310 or 312.

Suppose that a broadcaster is capturing the events on court 314 and presenting to user 304, e.g., on television 316. Streaming source 308 is capturing those events on court 314 via device 312 and presenting as streamed content 306. The events of court 314 are being observed by local users 318 (represented by dots corresponding to their physical beacons), and remote users 320 (represented by triangles corresponding to their virtual beacons).

Suppose that some events transpire on court 322, which are presently not being broadcasted and/or streamed. Application 302 detects shifting of focus 324 (e.g., a movement) of some physical beacons, shifting of focus of some virtual beacons as shown. Application 302 determines that the shifted focus of physical and/or virtual beacons has dwelled at court 322 for at least a threshold dwell period.

Application 302 sends an instruction to streaming source 308 to also shift the streaming focus to court 322. Streaming source 308 causes streaming content 306 to change by presenting the content captured from streaming device 310.

Figure 4:
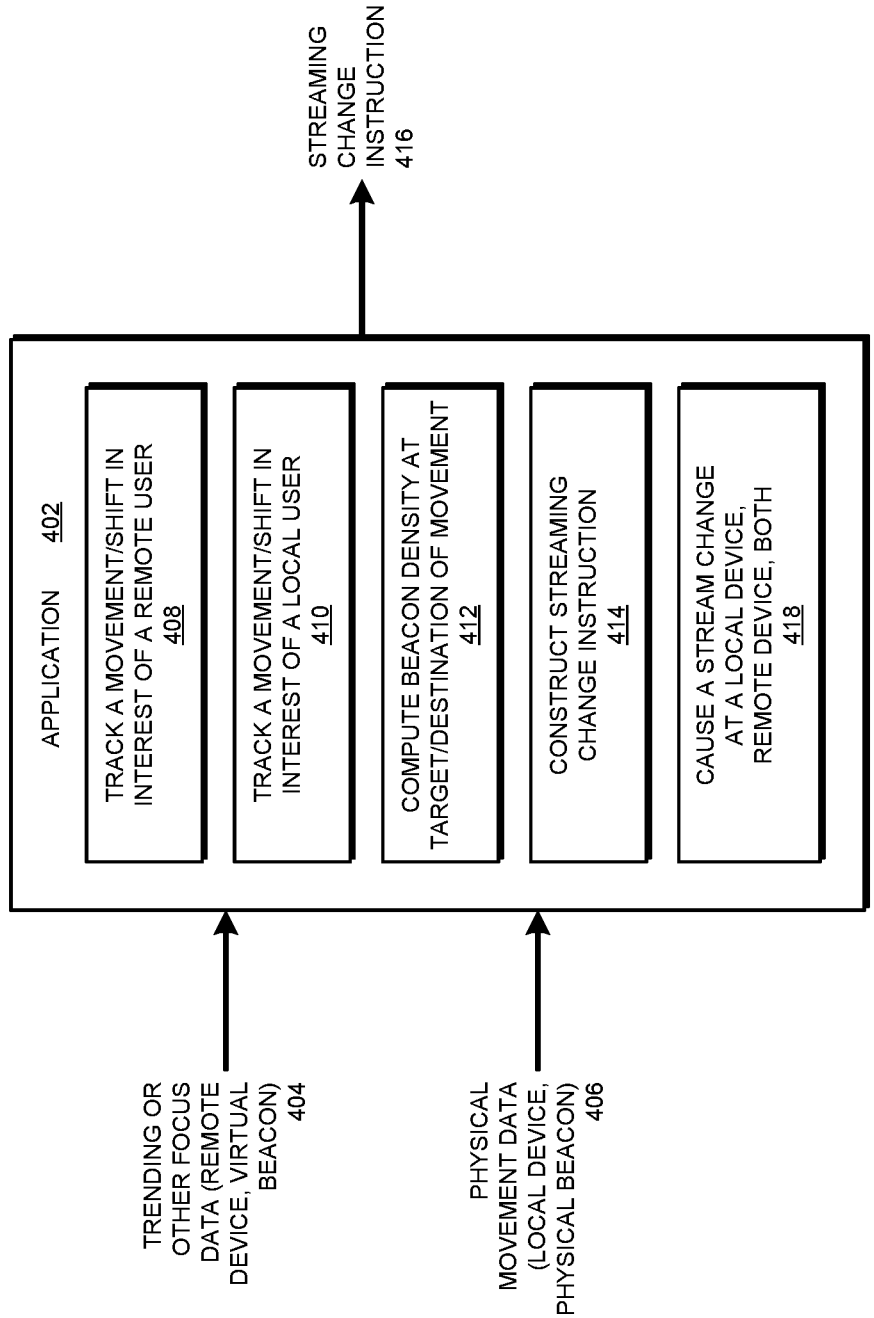
FIG. 4 depicts a block diagram of an application for event experience enhancement through remote and local user entanglement in accordance with an illustrative embodiment.

With reference to FIG. 4, this figure depicts a block diagram of an application for event experience enhancement through remote and local user entanglement in accordance with an illustrative embodiment. Application 402 is an example of application 302 in FIG. 3.

Application 402 receives input 404 from one or more remote devices or virtual beacons. Input 404 may be trending data from a social media data source, focus shift information from remote user devices, or some combination thereof.

Application 402 receives input 406 from one or more local devices or physical beacons. Input 406 may be actual physical movement data from local user devices, e.g., Global Positioning System (GPS) coordinates and changes therein.

Component 408 tracks a shift in the interest or focus of a remote user using input 404. For example, component 404 employs Gaussian Mixture Model (GMM) as follows to discover sub-populations of areas of interest within a population without knowing any notion of a sub-population population $$p(x,z) = p(z)p(x|z)$$

x=input feature vector such as location, tournament excitement and momentum
z=feature vector of court locations $$p(z) = p(z_k = \text{court}) = \pi_k$$

The sum of all pie's must equal 1 such that, $$\sum_{k=1}^{K} \pi_k = 1$$

To calculate the joint probability p (x,z), $$p(z) = \prod_{k=1}^{K} \pi_k^{z_k}$$

$$p(x|z) = \prod_{k=1}^{K} \mathcal{N}(x|\mu_k, \Sigma_k)^{z_k}$$

Now, we want to know the probability that we are at a specific court, $$p(z_k = \text{court}|x) = j = \frac{\pi_k \mathcal{N}(x|\mu_k, \Sigma_k)}{\Sigma_1^k \pi_j \mathcal{N}(x|\mu_j, \Sigma_j)}$$

This computation provides the probability that a user is focused at a specific location given feature vector x. A feature vector can similarly be extracted from social media trend data and a sub-population of remote users focused at a specific location due to that feature vector can be similarly determined.

Component 410 uses input 406 in a similar manner to determine a movement of a sub-population of local users to a specific location given feature vector x. For physical beacons, the feature vector can encode location data such as longitude and latitude, and tournament feature data such as tournament excitement and momentum.

This example method of determining focus shift is not intended to be limiting. From this disclosure, those of ordinary skill in the art will be able to conceive many other methods of determining focus shifts of remote users and local users, and the same are contemplated within the scope of the illustrative embodiments.

Component 412 determines whether the dwell periods are satisfied at the specific location by the physical and/or virtual beacons. For those physical and/or virtual beacons that satisfy the dwell period at the location, component 412 computes a beacon density at the location.

When the beacon density at the location of the shifted focus, component 414 constructs instruction 416. Instruction 416 is an instruction to change the streaming content to content captured from the location of the focus shift. Component 418 uses instruction 416 to cause the stream to change accordingly at a device associated with a local user, a device associated with a remote user, or both.

Figure 5:
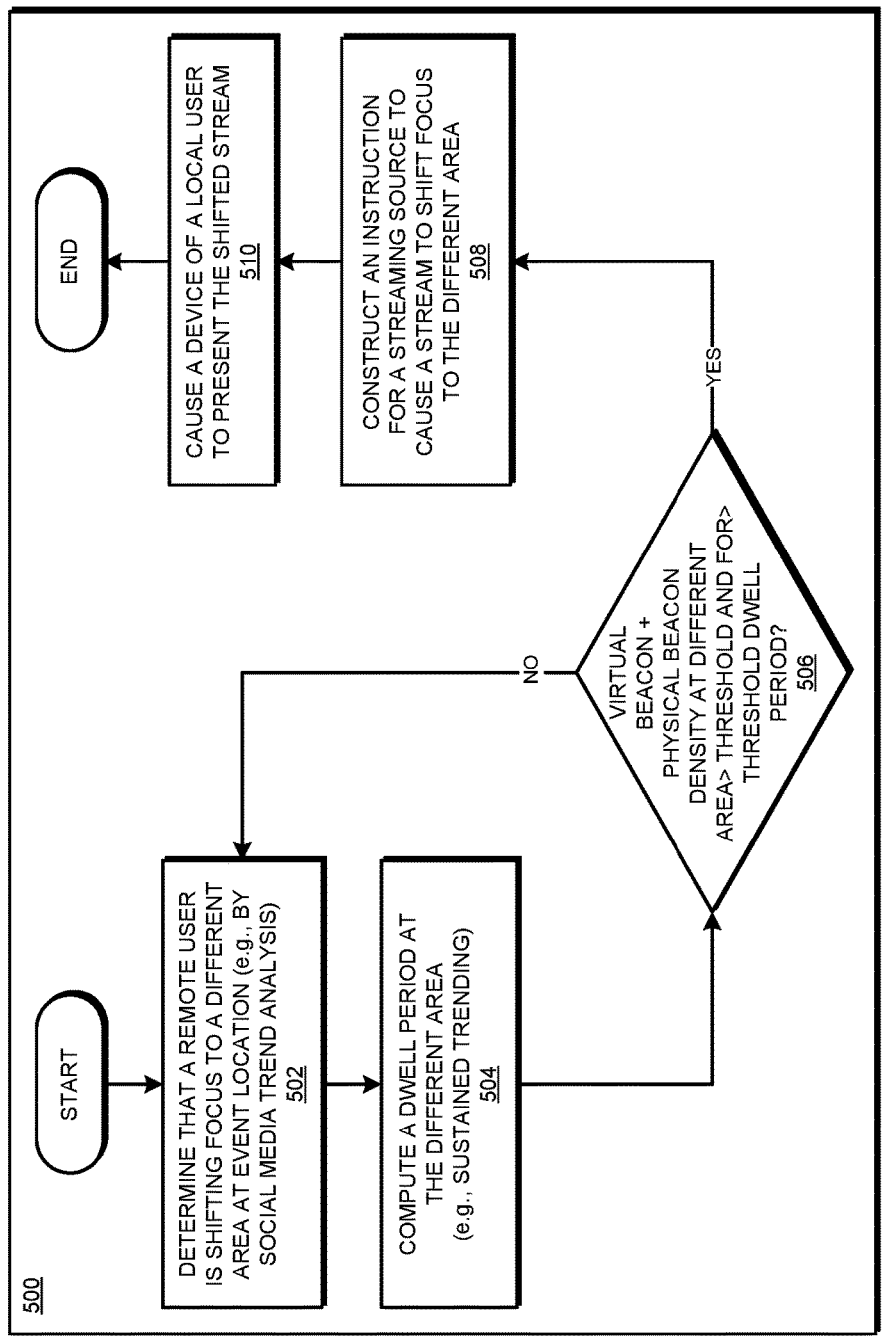
FIG. 5 depicts a flowchart of an example process for event experience enhancement through remote and local user entanglement in accordance with an illustrative embodiment.

With reference to FIG. 5, this figure depicts a flowchart of an example process for event experience enhancement through remote and local user entanglement in accordance with an illustrative embodiment. Process 500 can be implemented in application 402 in FIG. 4.

The application determines that a remote user is shifting focus to a different area at an event location (block 502). The application computes a dwell period at the different area (block 504). The application determines whether a beacon density of the physical and virtual beacons focused at the different area exceeds a threshold density for more than a threshold dwell period (block 506).

If the beacon density does not exceed the threshold density, the threshold dwell period, or both ("No" path of block 506), the application returns to tracking remote user focus shifts at block 502. If the beacon density does exceed the threshold density and the dwell period of those beacons exceeds the threshold dwell period ("Yes" path of block 506), the application constructs an instruction for a streaming source to cause s stream to shift focus to the different area of block 502 (block 508). The application causes a device of a local user to present the shifted stream thereby enhancing the local user's experience via entanglement with the remote user's focus shift (block 510). The application ends process 500 thereafter.

Figure 6:
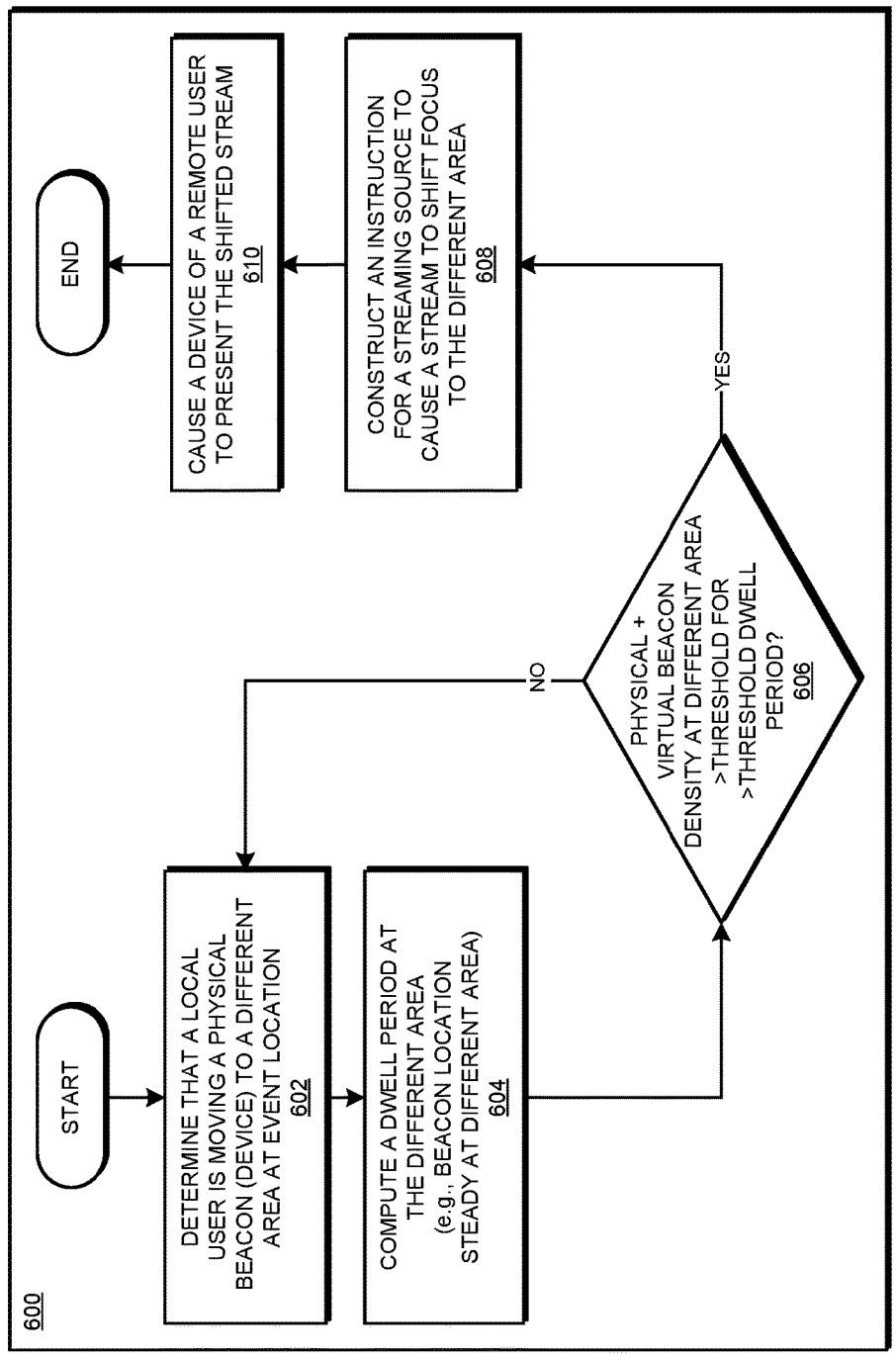
FIG. 6 depicts a flowchart of an example process for event experience enhancement through remote and local user entanglement in accordance with an illustrative embodiment.

With reference to FIG. 6, this figure depicts a flowchart of an example process for event experience enhancement through remote and local user entanglement in accordance with an illustrative embodiment. Process 600 can be implemented in application 402 in FIG. 4.

The application determines that a local user is moving a physical beacon to a different area at an event location (block 602). The application computes a dwell period at the different area (block 604). The application determines whether a beacon density of the physical and virtual beacons focused at the different area exceeds a threshold density for more than a threshold dwell period (block 606).

If the beacon density does not exceed the threshold density, the threshold dwell period, or both ("No" path of block 606), the application returns to tracking local user focus shifts at block 602. If the beacon density does exceed the threshold density and the dwell period of those beacons exceeds the threshold dwell period ("Yes" path of block 606), the application constructs an instruction for a streaming source to cause s stream to shift focus to the different area of block 602 (block 608). The application causes a device of a remote user to present the shifted stream thereby enhancing the remote user's experience via entanglement with the local user's focus shift (block 610). The application ends process 600 thereafter.

Thus, a computer implemented method, system or apparatus, and computer program product are provided in the illustrative embodiments for event experience enhancement through remote and local user entanglement and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   analyzing focus data of a remote user to determine a focus shift from a first area to a second area at an event arena;
   computing a beacon density at the second area, wherein the beacon density comprises a combination of (i) a number of physical beacons corresponding to a number of local users at the second area, and (ii) a number of virtual beacons corresponding to a number of remote users focused on the second area;
   generating, responsive to the beacon density at the second area exceeding a threshold density, an instruction to a streaming source; and
   causing the streaming source to change a streaming content to form changed streaming content, wherein the changed steaming content is related to the second area.

2. The method of claim 1, wherein the streaming content before the change is related to the first area, wherein the remote user is not present at the event arena, wherein a local user is present at the first area, and wherein the local user receives the changed streaming content thereby entangling an experience of the local user with the focus shift of the remote user.

3. The method of claim 1, further comprising:
   analyzing a movement of a local user by tracking a change in a location of a physical beacon associated with the local user;
   computing for the local user a second focus shift from the first area to a third area at an event arena;
   computing a second beacon density at the third area, wherein the second beacon density comprises a combination of (i) a number of physical beacons corresponding to a number of local users at the third area, and (ii) a number of virtual beacons corresponding to a number of remote users focused on the third area;
   generating, responsive to the second beacon density at the third area exceeding the threshold density, a second instruction to the streaming source; and
   causing the streaming source to perform a second change in streaming content to form second changed streaming content, wherein the second changed steaming content is related to the third area, wherein the streaming content before the second change is related to the first area, and the remote user receives the second changed streaming content thereby entangling an experience of the remote user with the second focus shift of the local user.

4. The method of claim 1, further comprising:
computing a dwell period of a focus of the remote user at the second area, wherein the generating is further responsive to the dwell period of each beacon included in the beacon density exceeding a threshold dwell period at the second area.

5. The method of claim 1, wherein the focus data comprises:
trending data of a topic in social media, wherein the topic comprises an event at the second area, wherein the remote user is consuming the streaming content about the first area, and wherein the remote user has the focus shift to the second area by interacting with the social media relative to the topic.

6. The method of claim 1, further comprising:
presenting the streaming content about the first area on a remote device associated with the remote user; and
computing the focus shift by detecting that the remote user is attempting to view the second area on the remote device.

7. A computer usable program product comprising one or more computer-readable storage devices, and program instructions stored on at least one of the one or more storage devices, the stored program instructions comprising:
program instructions to analyze focus data of a remote user to determine a focus shift from a first area to a second area at an event arena;
program instructions to compute a beacon density at the second area, wherein the beacon density comprises a combination of (i) a number of physical beacons corresponding to a number of local users at the second area, and (ii) a number of virtual beacons corresponding to a number of remote users focused on the second area;
program instructions to generate, responsive to the beacon density at the second area exceeding a threshold density, an instruction to a streaming source; and
program instructions to cause the streaming source to change a streaming content to form changed streaming content, wherein the changed steaming content is related to the second area.

8. The computer usable program product of claim 7, wherein the streaming content before the change is related to the first area, wherein the remote user is not present at the event arena, wherein a local user is present at the first area, and wherein the local user receives the changed streaming content thereby entangling an experience of the local user with the focus shift of the remote user.

9. The computer usable program product of claim 7, further comprising:
program instructions to analyze a movement of a local user by tracking a change in a location of a physical beacon associated with the local user;
program instructions to compute for the local user a second focus shift from the first area to a third area at an event arena;
program instructions to compute a second beacon density at the third area, wherein the second beacon density comprises a combination of (i) a number of physical beacons corresponding to a number of local users at the third area, and (ii) a number of virtual beacons corresponding to a number of remote users focused on the third area;
program instructions to generate, responsive to the second beacon density at the third area exceeding the threshold density, a second instruction to the streaming source; and
program instructions to cause the streaming source to perform a second change in streaming content to form second changed streaming content, wherein the second changed steaming content is related to the third area, wherein the streaming content before the second change is related to the first area, and the remote user receives the second changed streaming content thereby entangling an experience of the remote user with the second focus shift of the local user.

10. The computer usable program product of claim 7, further comprising:
program instructions to compute a dwell period of a focus of the remote user at the second area, wherein the generating is further responsive to the dwell period of each beacon included in the beacon density exceeding a threshold dwell period at the second area.

11. The computer usable program product of claim 7, wherein the focus data comprises:
trending data of a topic in social media, wherein the topic comprises an event at the second area, wherein the remote user is consuming the streaming content about the first area, and wherein the remote user has the focus shift to the second area by interacting with the social media relative to the topic.

12. The computer usable program product of claim 7, further comprising:
program instructions to present the streaming content about the first area on a remote device associated with the remote user; and
program instructions to compute the focus shift by detecting that the remote user is attempting to view the second area on the remote device.

13. The computer usable program product of claim 7, wherein the computer usable code is stored in a computer readable storage device in a data processing system, and wherein the computer usable code is transferred over a network from a remote data processing system.

14. The computer usable program product of claim 7, wherein the computer usable code is stored in a computer readable storage device in a server data processing system, and wherein the computer usable code is downloaded over a network to a remote data processing system for use in a computer readable storage device associated with the remote data processing system.

15. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to analyze focus data of a remote user to determine a focus shift from a first area to a second area at an event arena;
program instructions to compute a beacon density at the second area, wherein the beacon density comprises a combination of (i) a number of physical beacons corresponding to a number of local users at the second area, and (ii) a number of virtual beacons corresponding to a number of remote users focused on the second area;
program instructions to generate, responsive to the beacon density at the second area exceeding a threshold density, an instruction to a streaming source; and
program instructions to cause the streaming source to change a streaming content to form changed streaming content, wherein the changed steaming content is related to the second area.

16. The computer system of claim 15, wherein the streaming content before the change is related to the first area, wherein the remote user is not present at the event arena, wherein a local user is present at the first area, and wherein the local user receives the changed streaming content thereby entangling an experience of the local user with the focus shift of the remote user.

17. The computer system of claim 15, further comprising:
program instructions to analyze a movement of a local user by tracking a change in a location of a physical beacon associated with the local user;
program instructions to compute for the local user a second focus shift from the first area to a third area at an event arena;
program instructions to compute a second beacon density at the third area, wherein the second beacon density comprises a combination of (i) a number of physical beacons corresponding to a number of local users at the third area, and (ii) a number of virtual beacons corresponding to a number of remote users focused on the third area;
program instructions to generate, responsive to the second beacon density at the third area exceeding the threshold density, a second instruction to the streaming source; and
program instructions to cause the streaming source to perform a second change in streaming content to form second changed streaming content, wherein the second changed steaming content is related to the third area, wherein the streaming content before the second change is related to the first area, and the remote user receives the second changed streaming content thereby entangling an experience of the remote user with the second focus shift of the local user.

18. The computer system of claim 15, further comprising:
program instructions to compute a dwell period of a focus of the remote user at the second area, wherein the generating is further responsive to the dwell period of each beacon included in the beacon density exceeding a threshold dwell period at the second area.

19. The computer system of claim 15, wherein the focus data comprises:
trending data of a topic in social media, wherein the topic comprises an event at the second area, wherein the remote user is consuming the streaming content about the first area, and wherein the remote user has the focus shift to the second area by interacting with the social media relative to the topic.

20. The computer system of claim 15, further comprising:
program instructions to present the streaming content about the first area on a remote device associated with the remote user; and
program instructions to compute the focus shift by detecting that the remote user is attempting to view the second area on the remote device.

* * * * *